United States Patent
Park et al.

(10) Patent No.: US 9,014,199 B2
(45) Date of Patent: Apr. 21, 2015

(54) HOME CLOUD GATEWAY APPARATUS FOR MULTI-SERVICE AND METHOD OF PROVIDING SERVICE USING THE SAME

(71) Applicant: Electronics and Telecommunications Research Institute, Daejeon (KR)

(72) Inventors: Pyung-Koo Park, Daejeon (KR); Jung Sik Kim, Daejeon (KR); Ho Yong Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 117 days.

(21) Appl. No.: 13/752,685

(22) Filed: Jan. 29, 2013

(65) Prior Publication Data

US 2014/0003340 A1    Jan. 2, 2014

(30) Foreign Application Priority Data

Jun. 27, 2012 (KR) .................. 10-2012-0069448

(51) Int. Cl.
  *H04L 12/28* (2006.01)
  *H04M 1/253* (2006.01)
  *H04L 29/06* (2006.01)

(52) U.S. Cl.
  CPC ......... *H04M 1/2535* (2013.01); *H04L 12/2836* (2013.01); *H04L 63/08* (2013.01); *H04L 65/1069* (2013.01); *H04L 65/1073* (2013.01)

(58) Field of Classification Search
  CPC ............ H04L 12/2803; H04L 12/2818; H04L 12/283; H04L 12/2836; H04L 63/08; H04L 12/28; H04L 12/66
  USPC ......... 370/352, 400, 389, 401, 392, 356, 419, 370/420, 329; 379/67.1, 83, 84, 91.1, 91.2, 379/93.02, 93.01, 142.05, 142.07, 201.02, 379/219; 726/1–6, 11, 12, 13, 14, 17, 21, 726/26, 27–30
  See application file for complete search history.

(56) References Cited

U.S. PATENT DOCUMENTS

| | | | | |
|---|---|---|---|---|
| 7,809,386 | B2 * | 10/2010 | Stirbu ........................ | 455/503 |
| 2009/0086742 | A1 * | 4/2009 | Ghai et al. .................. | 370/401 |
| 2010/0135279 | A1 * | 6/2010 | Petersson et al. ........... | 370/352 |
| 2013/0166965 | A1 * | 6/2013 | Brochu et al. ............... | 714/48 |

FOREIGN PATENT DOCUMENTS

KR     10-0876238     12/2008

OTHER PUBLICATIONS

Joong, Hyun-Joong, "A Study on Home Networks Functional Model for Personal Area Network based Virtual Home Network," Journal of the Korea Society of Computer and Information, vol. 3:167-174 (2005).

* cited by examiner

*Primary Examiner* — Hanh N Nguyen
(74) *Attorney, Agent, or Firm* — Nelson Mullins Riley & Scarborough LLP

(57) ABSTRACT

A home cloud gateway apparatus that is connected to an indoor home network and that provides a service to a client that connects through the network includes an Internet interface unit, a phone exchange unit, a storage unit that stores a virtual computer module, and an authentication processor. The home cloud gateway apparatus provides a virtual computer service by activating the virtualization module that is stored at the storage unit, and provides a phone call service through the Internet and a phone call service through the Internet and a phone network using the Internet interface unit and the phone exchange unit.

9 Claims, 13 Drawing Sheets

HOME CLOUD GATEWAY APPARATUS FOR MULTI-SERVICE AND METHOD OF PROVIDING SERVICE USING THE SAME

CROSS-REFERENCE TO RELATED APPLICATION

This application claims priority to and the benefit of Korean Patent Application No. 10-2012-0069448 filed in the Korean Intellectual Property Office on Jun. 27, 2012, the entire contents of which are incorporated herein by reference.

BACKGROUND OF THE INVENTION (a) Field of the Invention

The present invention relates to a home cloud gateway apparatus for a multi-service and a method of providing a service using the same.

(b) Description of the Related Art

With the development of wireless communication, communication technology has been rapidly developed to a step of connecting each home with a network via an increase in a speed of a subscriber access network. While enabling data transmission between apparatuses and data transmission to an external communication apparatus by connecting indoor electronic devices and apparatuses that can perform communication and enabling remote access to indoor apparatuses from the outside and control of the indoor apparatuses, a home network indicates all technologies that provide a bi-directional communication service environment.

In order to provide various services through a home network, by providing information sharing and service interlock between indoor apparatuses, a virtual home network in which a networking range is extended to a public network has been developed. However, apparatuses for substantially providing a service through an indoor communication apparatus are individually provided on a service basis. For example, in order to provide a wireless Internet service, an access point (AP) should be installed, and for a satellite television service, a set-top box should be installed. Further, in order to use a personal computer (PC) function indoors, a separate computer should be installed. Accordingly, a cost for separately installing, maintaining, and managing apparatuses for each service increases, and integration management of each apparatuses is not easy.

In addition, nowadays, as a smart phone is widely used, an information technology (IT) environment changes and thus a request for various operation software (OS) increases, and a hardware apparatus (e.g., a PC) that can support the request is requested and thus an economic burden increases.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a home cloud gateway apparatus and a method of providing a service using the same having advantages of integrally providing a communication-based multi-service through a home network.

An exemplary embodiment of the present invention provides a home cloud gateway apparatus that is connected to an indoor home network and that provides a service to a client that connects through the network, the home cloud gateway apparatus including: an Internet interface unit that performs Internet communication through a wired or wireless network; a phone exchange unit that performs phone communication through a phone network and that performs phone communication through the phone network and the Internet; a storage unit that stores a virtual computer module; an authentication processor that performs authentication processing of a connecting client; a virtualization processor that provides a virtual computer service by activating a virtualization module that is stored at the storage unit; a session processor that performs connection and release of a session for call processing through the Internet and connection and release of a session for call processing through the Internet and the phone network by connecting to the Internet interface unit and the phone exchange unit; and a control processor that provides an Internet service through the Internet interface unit to a client in which authentication processing has been performed and that provides a phone service by connecting to the session processor and that provides the virtual computer service by connecting to the virtualization processor.

The home cloud gateway apparatus may further include: a graphic output unit that outputs image data that is generated according to communication; a broadcasting signal receiving unit that receives a broadcasting signal that is transmitted from the outside; an audio input unit that receives an input of an audio signal; an image input unit that receives an input of an image signal; and a codec that encodes a signal that is provided from the audio input unit or the image input unit or that decodes and outputs input data.

The home cloud gateway apparatus may further include a remote control receiving unit that receives a remote control signal, wherein the control processor may receive a broadcasting signal of a broadcasting channel corresponding to the remote control signal from the broadcasting signal receiving unit and provide a broadcasting service that is output through the graphic output unit.

The control processor may include a security module that sets a security method according to a connection path of the authenticated client. The security module may set a security method having a higher security ability than a security method that is set when the client connects through wireless Internet, when the client connects through wired Internet.

The control processor may include a camera processing module for connecting to the image input unit, a media codec driver for connecting to the codec, an IP-PBX card device driver for connecting to the phone exchange unit, and a wired card driver and wireless card driver for connecting to the Internet interface unit.

Another embodiment of the present invention provides a method of providing a multi-service through a home cloud gateway apparatus that is connected to an indoor home network and that provides a service to a client that is connected through the network, the method including: setting a security method according to a connection path of the client, when an authentication request is received from the client and the client is a registered client; controlling and managing a communication apparatus by processing data that is provided from the client according to the set security method and transmitting the data to the communication apparatus that is connected to the home network; and providing, when the client is registered at a session processor of the home cloud gateway apparatus, if a call connection is performed, an IP phone service by processing input audio and image data and transmitting the processed data through the Internet and by processing and transmitting audio and image data that is received from the Internet.

The setting of a security method may include: allowing the connection when a client that requests a connection is registered; setting a first security method when the client is connected through wired Internet; and setting a second security method when the client is connected through wired Internet, wherein a security ability of the first security method may be higher than that of the second security method.

The method may further include providing a virtual computer service by activating a virtual computer module that is stored at the home cloud gateway apparatus.

The providing of an IP phone service may include: processing and outputting a signal that is received from a public telephone network according to a call connection in a state in which a communicating client is registered at a session processor of the home cloud gateway apparatus; and processing an input sound signal and transferring the sound signal to the public telephone network.

DETAILED DESCRIPTION OF THE EMBODIMENTS

Figure 1:
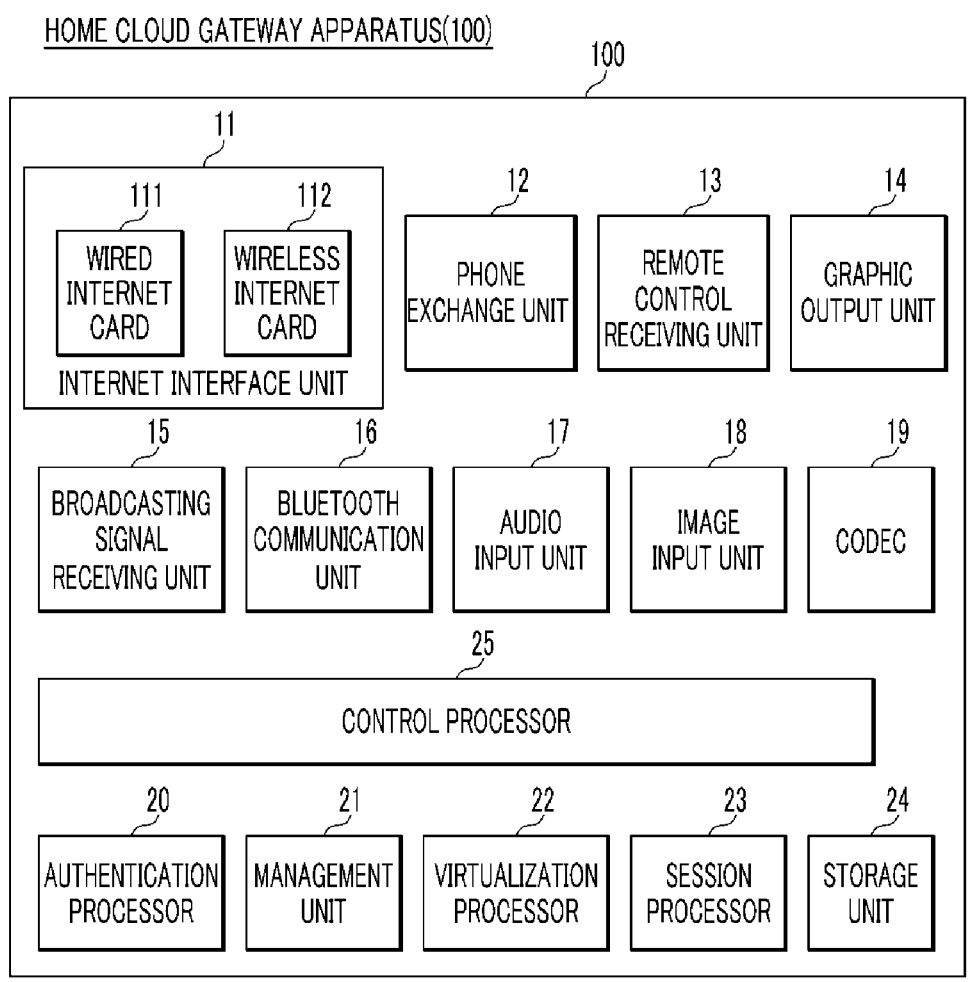
FIG. 1 is a diagram illustrating a configuration of a home cloud gateway apparatus for providing a multi-service according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising" will be understood to imply the inclusion of stated elements but not the exclusion of any other elements.

Hereinafter, a home cloud gateway apparatus for providing a multi-service and a method of using the same according to an exemplary embodiment of the present invention will be described.

FIG. 1 is a diagram illustrating a configuration of a home cloud gateway apparatus for providing a multi-service according to an exemplary embodiment of the present invention.

As shown in FIG. 1, a home cloud gateway apparatus 100 that provides a multi-service according to an exemplary embodiment of the present invention includes an Internet interface unit 11, a phone exchange unit 12, a remote control receiving unit 13, a graphic output unit 14, a broadcasting signal receiving unit 15, a Bluetooth communication unit 16, an audio input unit 17, an image input unit 18, and a codec 19. Further, the home cloud gateway apparatus 100 further includes an authentication processor 20, a management unit 21, a virtualization processor 22, a session processor 23, a storage unit 24, and a control processor 25.

The Internet interface unit 11 performs data transmission/reception through the Internet, and for this purpose, the Internet interface unit 11 includes a wired Internet card 111 that performs Internet communication through a wired network and a wireless Internet card 112 that performs Internet communication through a wireless network.

The phone exchange unit 12 performs communication through a phone network and the Internet, and may be formed with an Internet protocol-private branch exchange (IP-PBX).

The remote control receiving unit 13 receives a remote control signal that is transmitted/received from an external remote control apparatus (not shown). The received remote control signal may be provided to the management unit 21 or to the authentication processor 20, the virtualization processor 22, and the session processor 23.

The graphic output unit 14 processes input output data and outputs the processed data to an external monitor device (not shown), and processes and outputs the output data according to a video graphic array (VGA) or high definition multimedia interface (HDMI) specification.

The broadcasting signal receiving unit 15 receives a television signal, i.e., a broadcasting signal that is transmitted from the outside, and particularly, it may be formed with a cable and a satellite television receiving card that can receive a broadcasting signal that is transmitted through CATV or a satellite.

The Bluetooth communication unit 16 performs Bluetooth communication with an external apparatus, for example, performs communication according to a Bluetooth specification with a device such as a wireless keyboard or a wireless mouse.

The audio input unit 17 receives an input of an audio signal from the outside, and for this purpose, the audio input unit 17 may be a microphone MIC. The image input unit 18 receives an input of an image signal from the outside and may be a web camera.

The codec 19 encodes and outputs an input signal or decodes and outputs an input signal. For example, the codec 19 encodes and outputs a signal to transmit through an external network, and decodes and outputs a signal that is received through an external network.

In order to receive a service through a network using the home cloud gateway apparatus 100 according to an exemplary embodiment of the present invention, the authentication processor 20 performs connection authentication by connecting to the management unit 21.

The management unit 21 stores and manages information about users that can receive various multi-services through the home cloud gateway apparatus 100 according to an exemplary embodiment of the present invention.

The virtualization processor 21 provides a virtual computer service. The virtualization processor 21 provides a function as a computer by activating a virtual computer module that is stored at the storage unit 24.

The session processor 23 forms, manages, and cancels sessions between an indoor communication apparatus through a network and remote communication apparatuses that are connected to the network. The session processor 23 functions as a session information protocol (SIP) server of an indoor communication apparatus (e.g., a communication apparatus such as a mobile phone that is positioned indoors) according to an SIP and enables phone communication through wired or wireless Internet.

At the storage unit 24, data and a module for providing various multi-services through the home cloud gateway apparatus 100 are stored, and particularly, a virtualization module is stored.

The control processor 25 includes a security module 251 and a module 252 for hyper transfer protocol (HTTP).

The home cloud gateway apparatus 100 according to an exemplary embodiment of the present invention having such a configuration may have a form that can be installed indoors.

Figure 2:
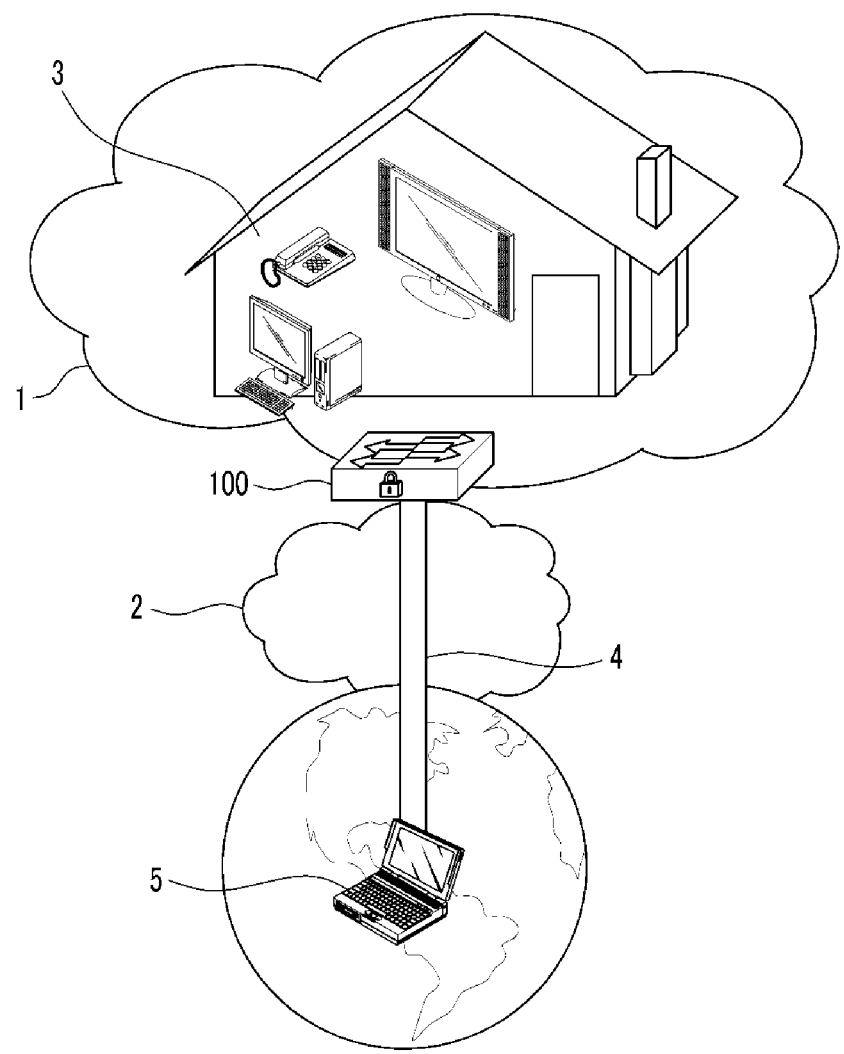
FIG. 2 is a diagram illustrating a network environment and service providing concept that provide a service using a home cloud gateway apparatus according to an exemplary embodiment of the present invention.

FIG. 2 is a diagram illustrating a network environment and service providing concept that provide a service using a home cloud gateway apparatus according to an exemplary embodiment of the present invention.

As shown in FIG. 2, the home cloud gateway apparatus 100 is positioned indoors to connect a home network 1 and Internet 2, and operates as a gateway constituting a home cloud. The home network 1 connects various kinds of apparatuses 3 (e.g., a computer, a phone, and a TV) indoors, and the home cloud gateway apparatus 100 provides various home network services (e.g., an Internet phone and a virtual computer service) to an apparatus 5 that connects from the outside by connecting to the home network 1. At the inside of a house, a service is provided using the home cloud gateway apparatus 100 through authentication, and at the outside of a house, a service is provided through a security connection function of the home cloud gateway apparatus 100. Accordingly, by connecting to the various apparatuses 3 that are connected to the home network through the home cloud gateway apparatus 100 regardless of a position of the apparatus 5 to receive a service, a related service may be provided. That is, even when outside, a user can use an indoor computer thereof through the home cloud gateway apparatus 100 and can receive an Internet phone service using an indoor phone or receive a service through an indoor TV.

Figure 3:
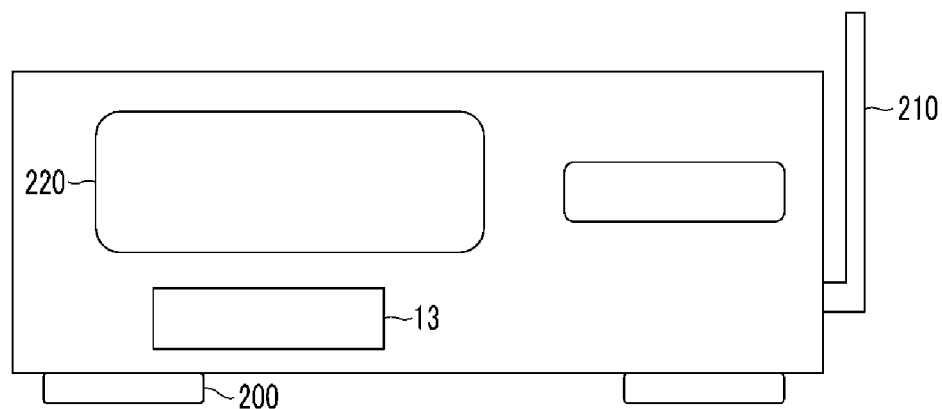
FIGS. 3 and 4 are diagrams illustrating an example of a home cloud gateway apparatus according to an exemplary embodiment of the present invention.
Figure 4:
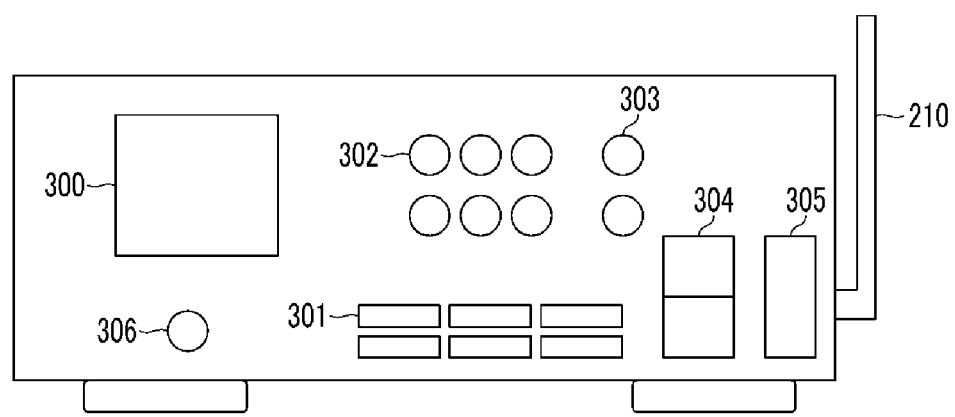

FIGS. 3 and 4 are diagrams illustrating an example of a home cloud gateway apparatus according to an exemplary embodiment of the present invention, particularly, FIG. 3 illustrates a structure of a front surface portion of a home cloud gateway apparatus, and FIG. 4 illustrates a structure of a rear surface portion of a home cloud gateway apparatus.

In order to have a form that may be installed at a predetermined indoor space, as illustrated in FIG. 3, the home cloud gateway apparatus 100 according to an exemplary embodiment of the present invention has a form that is supported by a support 200, and the remote control receiving unit 13 may be installed at the front surface portion for easy communication with a user, and an antenna 210 for communication with an external communication apparatus may be installed. In addition, at the front surface portion of the home cloud gateway apparatus 100, a state display unit 220 for displaying a communication state or an operation state to the user may be installed, and the state display unit 220 may be formed with a light emitting device (LED).

Further, constituent elements for interface with an external communication apparatus may be installed at a rear surface portion of the home cloud gateway apparatus 100. For example, as shown in FIG. 4, a power supply unit 300 may be installed at the rear surface portion, and a USB interface 301, component and composite output interfaces 302, an S-Video connection unit 303, an ethernet interface 304, an HDMI interface 305, and a TV input device 306 for efficient connection with an external apparatus may be installed at the rear surface portion.

Hereinafter, a method of providing a service through a home cloud gateway apparatus according to an exemplary embodiment of the present invention will be described based on such a structure.

First, a process of performing connection authentication that is performed by a home cloud gateway apparatus will be described.

Figure 5:
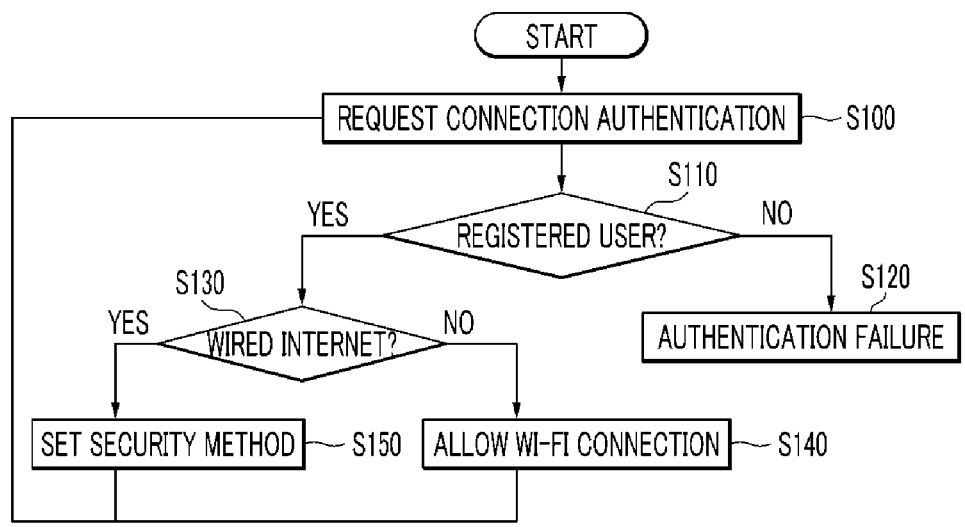
FIG. 5 is a flowchart illustrating a connection authentication process of a home cloud gateway apparatus according to an exemplary embodiment of the present invention.
Figure 6:
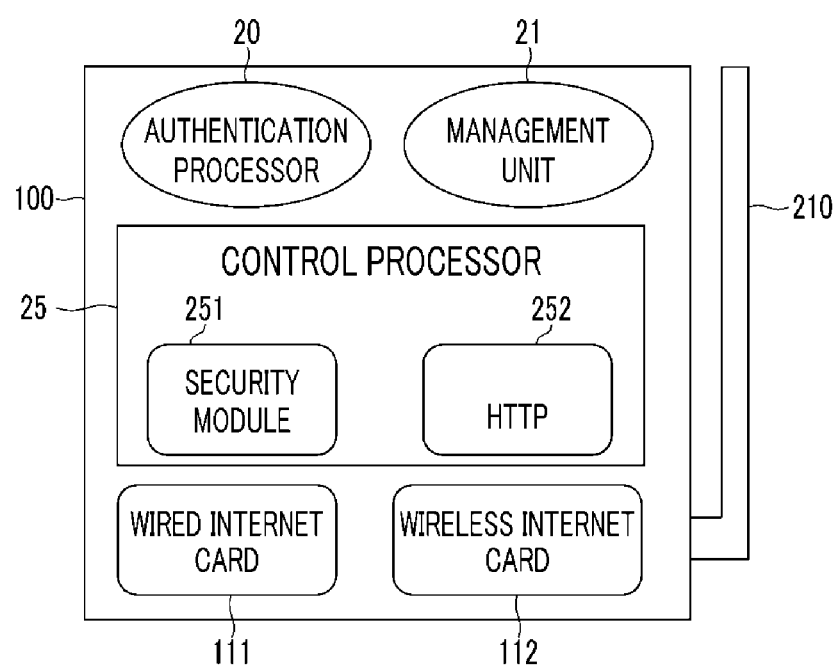
FIG. 6 is a diagram illustrating a relationship between constituent elements for connection authentication processing.

FIG. 5 is a flowchart illustrating a connection authentication process of a home cloud gateway apparatus according to an exemplary embodiment of the present invention, and FIG. 6 is a diagram illustrating a relationship between constituent elements for connection authentication processing.

As shown in FIG. 5, when a request for connection authentication is input (S100), the home cloud gateway apparatus 100 determines whether a user is a registered user and determines an authentication failure or an authentication success according to a result thereof (S110). Specifically, as shown in FIG. 5, when an authentication request is received from a communication apparatus (not shown) through the wired Internet card 111 or the wireless Internet card 112 of the Internet interface unit 11, the authentication processor 20 inquires whether a user is a registered user while providing user information that is included in the received authentication request to the management unit 21. If a user is not a registered user according to an inquiry result from the management unit 21, the authentication processor 20 outputs an authentication failure result (S120). The authentication failure result is transmitted to a corresponding communication apparatus through the Internet interface unit 11.

If a user is a registered user, the authentication processor 20 divides a connection path of the communication apparatus that transmits the authentication request (S130). That is, the authentication processor 20 determines whether the communication apparatus transmits an authentication request through wired Internet or wireless Internet. If the communication apparatus is connected through wireless Internet, the authentication processor 20 determines that a corresponding communication apparatus is an internal user that is positioned indoors, and a security module 251 of the control processor 25 sets a security method that provides general wireless Internet (S140). For example, the security module 251 may set a security method such as WEP, Wi-Fi protected access (WPA-PSK), and WPA2-PSK that are provided in wireless Internet and set an encryption method such as a temporal key integrity protocol (TKIP) and advanced encryption standard (AES). Here, the security module 251 sets a related security method according to an authentication result from the authentication processor 20.

If the communication apparatus is connected through wired Internet at step S130, it is determined that a corresponding communication apparatus is positioned at the outside instead of indoors, and the security module 251 sets a stronger security method than that when the communication apparatus is connected through wired Internet. That is, the security module 251 sets a security method having a higher security ability. For example, the security module 251 sets a security method of performing security processing according to a protocol such as an IP security protocol (IPSec) and a secure socket layer virtual private network (SSL VPN) (S150).

Authentication of a communication apparatus that requests a connection through such a process is performed, and a connection is allowed.

According to a security method that is set in such a connection process, a security processing of data transmission/reception of a communication apparatus 500 (hereinafter, for convenience of description, referred to as a connection client) that requests a connection to the home cloud gateway apparatus 100 may be performed.

Figure 7:
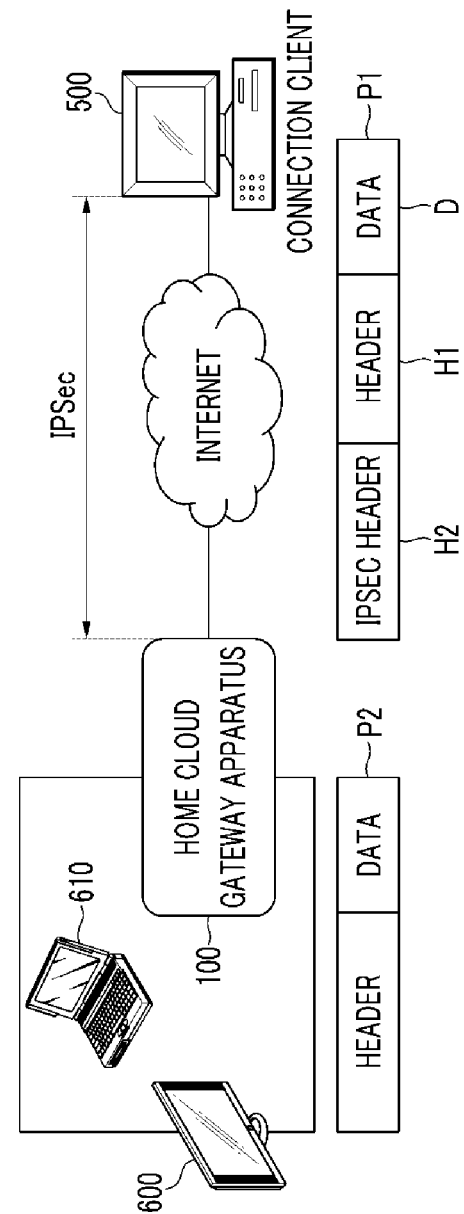
FIG. 7 is a diagram illustrating a security processing according to an exemplary embodiment of the present invention.

FIG. 7 is a diagram illustrating security processing according to an exemplary embodiment of the present invention. Here, after a client at the outside receives connection authentication as described above, when the client controls an indoor electronic device, for example, a television, the client performs security processing according to a predetermined security method.

When IPSec is set as a security method, a data packet P1 that is transmitted from the client 500 at the outside includes an IPSec header H2 in addition to a header H1 and data D1, and such a data packet is input to the home cloud gateway apparatus 100. The home cloud gateway apparatus 100 receives a data packet including the IPSec header H2, deletes and decodes the IPSec header H2, and transfers the packet P2 to original destinations 600 and 610. Therefore, the client 500 at the outside safely and easily controls the apparatuses 600 and 610 indoors.

When the client inside of a house connects to the home cloud gateway apparatus 100 through wireless Internet, the client does not use the above IPSec.

Further, a client for which connection authentication has been performed may perform a phone call with another communication apparatus through the home cloud gateway apparatus 100.

Figure 8:
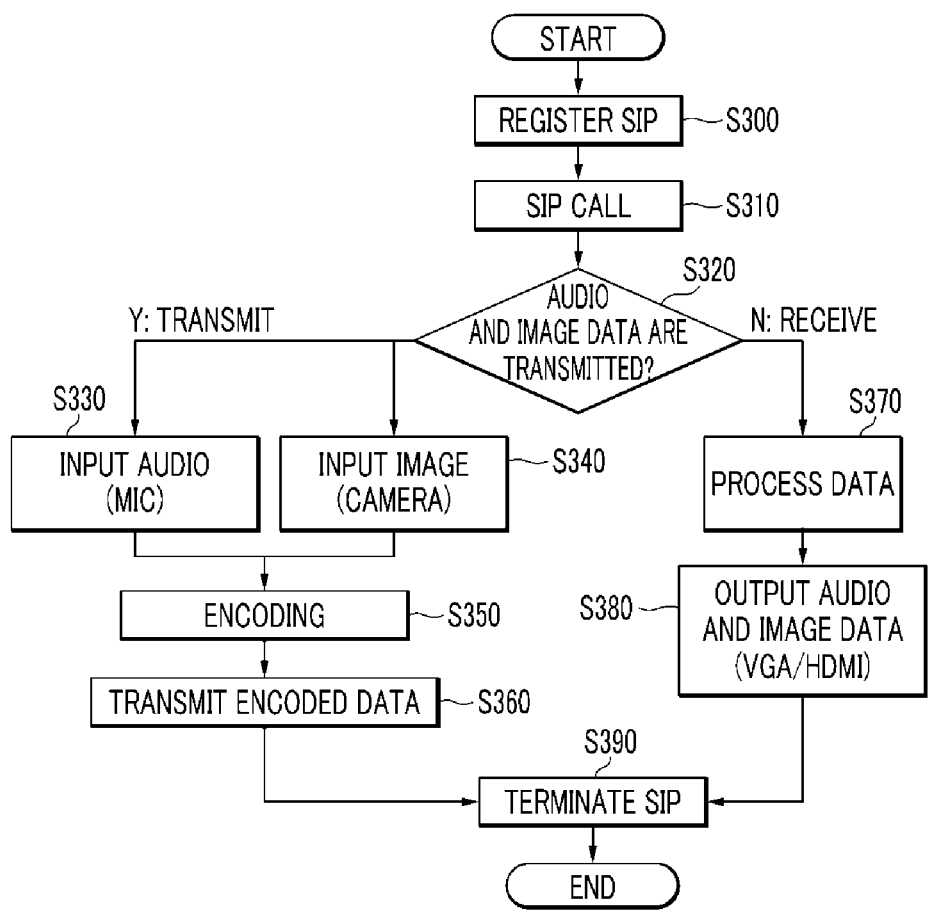
FIG. 8 is a flowchart illustrating an IP phone communication process in a home cloud gateway apparatus according to an exemplary embodiment of the present invention.
Figure 9:
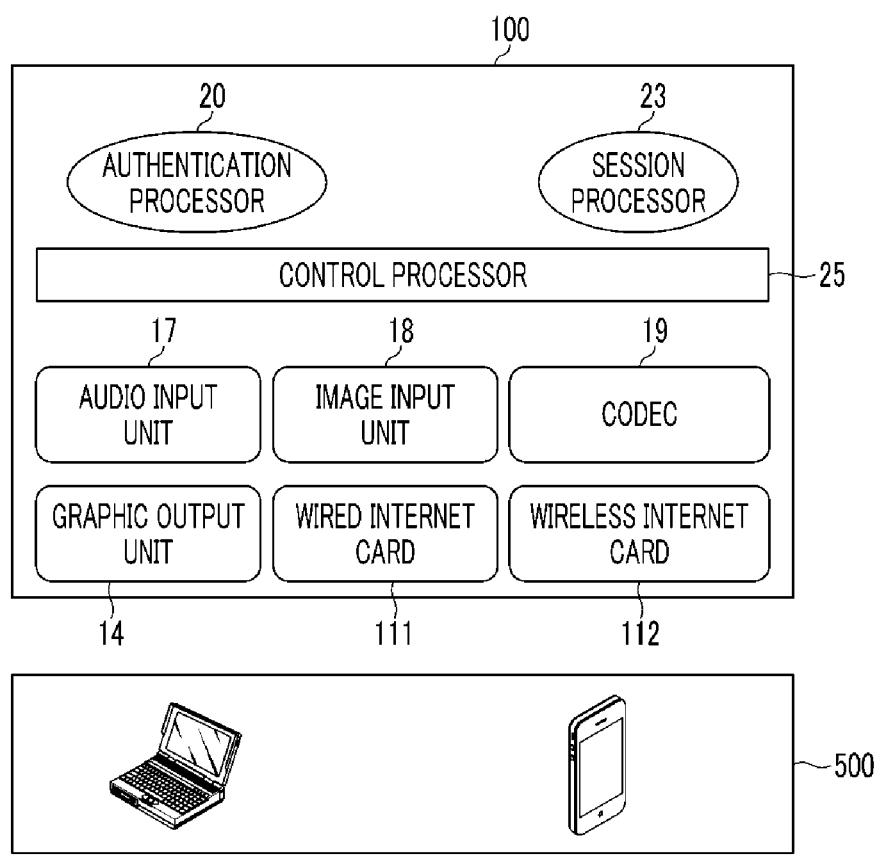
FIG. 9 is a diagram illustrating a relationship between constituent elements for phone communication processing.

FIG. 8 is a flowchart illustrating an IP phone communication process in a home cloud gateway apparatus according to an exemplary embodiment of the present invention, and FIG. 9 is a diagram illustrating a relationship between constituent elements for phone communication processing.

When a client inside of a house performs a phone call with an external communication apparatus, the client should be registered at the session processor 23. That is, the session processor 23 functions as an SIP server to the client inside of a house. For example, as shown in FIG. 8, when the client 500 performs an IP phone using a laptop computer, the client 500 may perform a phone call using the audio input unit 17 such as a microphone and the image input unit 18 such as a web camera.

For this purpose, the session processor 23 of the home cloud gateway apparatus 100 registers the client 500 (S300), as shown in FIG. 8. When a request for a call connection is input (S310), the session processor 23 performs call connection between a registered client and a communication apparatus, which is in communication with another party, and when call connection is performed, processing of audio and image data that are transmitted/received by the control processor 25 is performed. For this purpose, as a media processing function of the control processor 25 is activated, processing of audio and image data that are transmitted/received according to a call connection may be performed.

The control processor 25 determines whether audio and image data from the client 500 are transmitted to a communication apparatus (not shown), which is in communication with another party (S320), and if audio and image data from the client 500 are transmitted to a communication apparatus (not shown), the control processor 25 encodes audio data and image data (S330, S340) that are provided from the audio input unit 17 and the image input unit 18, respectively, through the codec 19 (S350), and the control processor 25 transmits the encoded data to the communication apparatus (S360).

If audio and image data are received from a communication apparatus, which is in communication with another party, the control processor 25 processes and outputs the received audio and image data (S370) and outputs, for example, image data through the graphic output unit 14 (S380).

When a phone call between the client 500 and the communication apparatus is terminated, the control processor 25 cancels the connected session and the process is terminated (S390).

When such a phone call is processed, the home cloud gateway apparatus 100 according to an exemplary embodiment of the present invention can be processed by interlocking a phone PBX through an IP phone and a general PSTN.

Figure 10:
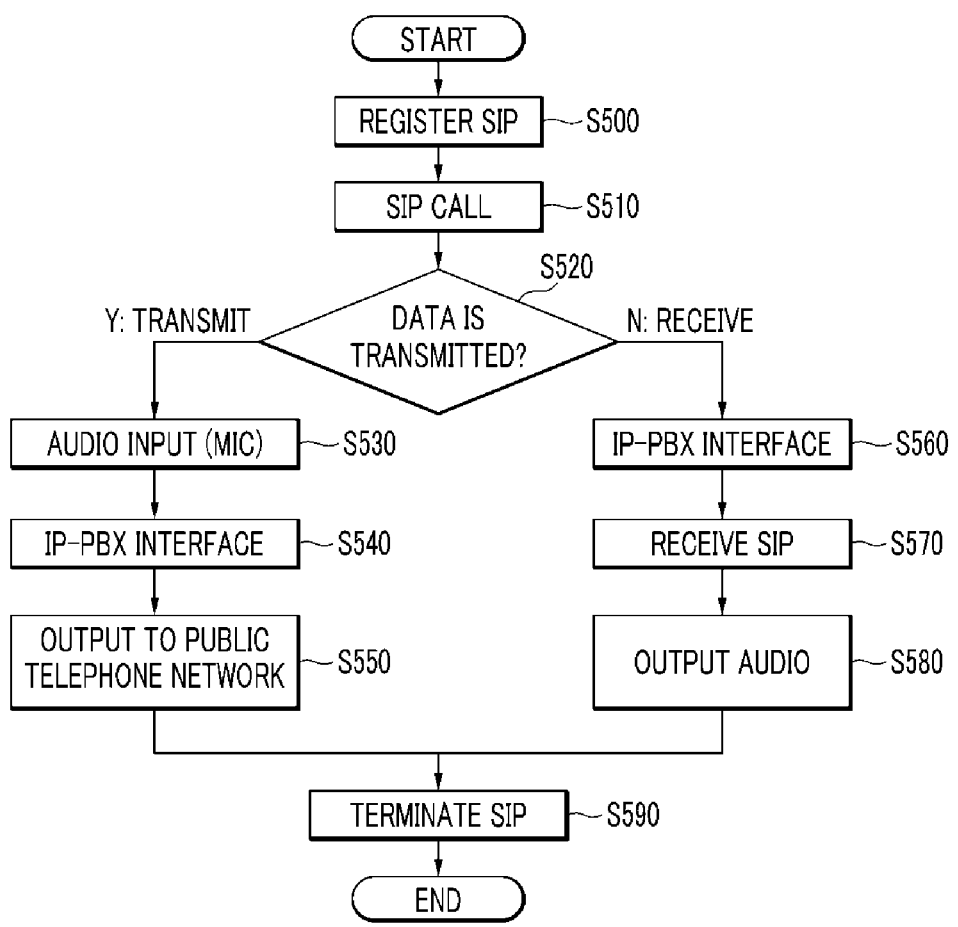
FIG. 10 is a flowchart illustrating a process of interlocking an IP phone and a general phone in a home cloud gateway apparatus according to an exemplary embodiment of the present invention.
Figure 11:
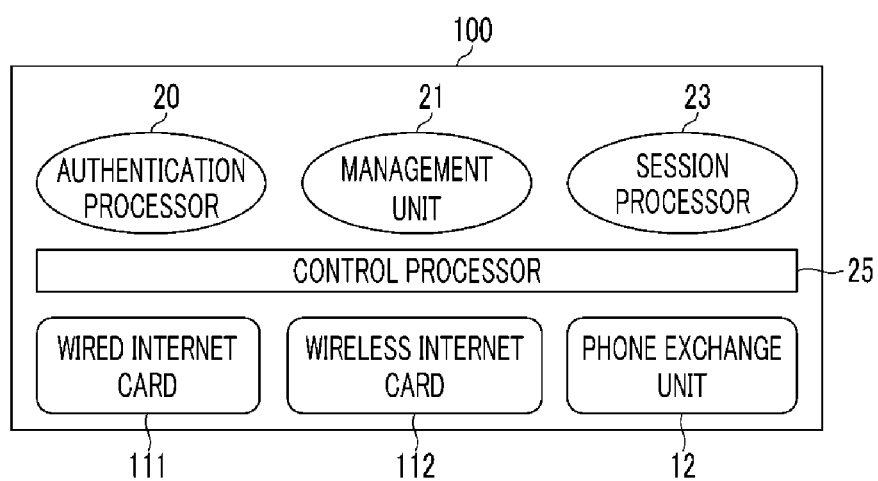
FIG. 11 is a diagram illustrating a relationship between constituent elements for phone interlock processing.

FIG. 10 is a flowchart illustrating a process of interlocking an IP phone and a general phone in a home cloud gateway apparatus according to an exemplary embodiment of the present invention, and FIG. 11 is a diagram illustrating a relationship between constituent elements for phone interlock processing.

In an exemplary embodiment of the present invention, in order to interlock an IP phone and a general phone PBX, the home cloud gateway apparatus 100 includes a phone exchange unit 12 and the phone exchange unit 12 includes an IP-PBX interface card. The phone exchange unit 12 receives an input of a signal that is transferred from a public telephone network (PSTN) through a general phone line through the IP-PBX interface card, converts phone data that is formed in an IP packet to an audio signal, and transmits the converted signal to the public telephone network. Because image data is not transmitted to the public telephone network, upon interlocking with the public telephone network, an output through the graphic output unit 14 does not exist.

When a general phone and an IP phone are interlocked, a client to perform communication is connection-authenticated, and should be registered at the session processor 23 (S500), as shown in FIG. 10. In such a state, when a signal is received according to a call connection (S510) from the public telephone network, the control processor 25 processes transmitted/received data by connecting to the phone exchange unit 12 and the Internet interface unit 11, as shown in FIG. 11.

The control processor 25 determines whether data that is received through the Internet interface unit 11 is transmitted to the communication apparatus that is connected to the public telephone network (S520), and if data that is received through the Internet interface unit 11 is transmitted to the communication apparatus that is connected to the public telephone network, the control processor 25 transfers audio data that is input through the audio input unit 17 to the phone exchange unit 12 and enables the audio data to be transmitted to the communication apparatus that is connected to the public telephone network (S530-S550).

If a signal is received from the public telephone network, the phone exchange unit 12 transfers the received audio data to the control processor 25, and the control processor 25 outputs the received audio data. For example, the control processor 25 outputs the audio data through a speaker (S560-S580). Here, the phone exchange unit 12 may process a signal from the public telephone network into an IP packet, output the IP packet to the Internet interface unit 11 through the control processor 25, and transmit the IP packet to an apparatus that is connected to wired or wireless Internet.

Further, a home cloud gateway apparatus according to an exemplary embodiment of the present invention may function as a general computer.

Figure 12:
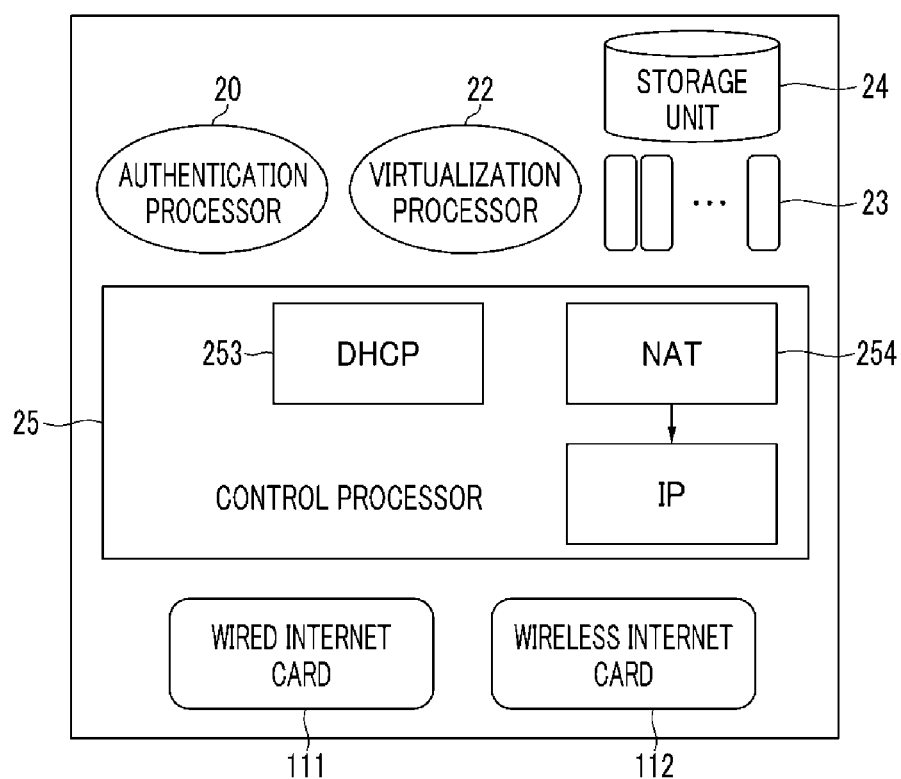
FIG. 12 is a diagram illustrating a relationship between constituent elements for providing a virtual computer to a user in a home cloud gateway apparatus according to an exemplary embodiment of the present invention.

FIG. 12 is a diagram illustrating a relationship between constituent elements for providing a virtual computer to a user in a home cloud gateway apparatus according to an exemplary embodiment of the present invention.

A virtual computer service is a service that provides a personal computer with a software method, and for this purpose, a virtual computer module is stored at the storage unit 24. In order to provide a virtual computer service, before the virtualization processor 22 activates a virtual computer module that is stored at the storage unit 24, the control processor 25 receives a private IP address through a dynamic host configuration protocol (DHCP) 253 and prepares for communication. In an Internet service, the control processor 25 converts a private IP address to an official IP address through an address converter NAT 254 and enables Internet execution. In consideration of performance of the home cloud gateway apparatus 100 according to an exemplary embodiment of the present invention, the number of virtual computers that can be provided may be set, and as a virtual computer service is provided by the virtualization processor 22 and the control processor 25, maintenance cost thereof is inexpensive. Here, a virtual computer service may be provided using a zero client. Even when a virtual computer service is provided, a security function may be provided, as shown in FIGS. 6 and 7. Therefore, the user can use a virtual computer thereof through the home cloud gateway apparatus 100 regardless of position.

Further, the home cloud gateway apparatus 100 according to an exemplary embodiment of the present invention can receive and output a broadcasting signal.

Figure 13:
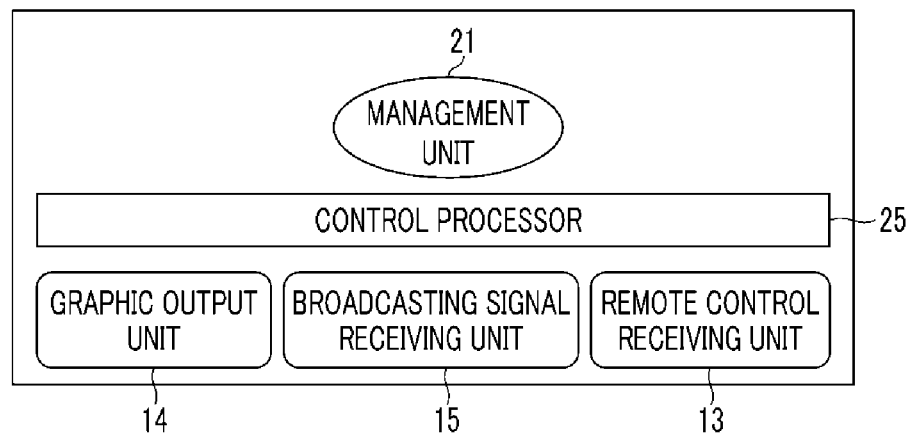
FIG. 13 is a diagram illustrating a relationship between constituent elements for receiving and outputting a broadcasting signal in a home cloud gateway apparatus according to an exemplary embodiment of the present invention.

FIG. 13 is a diagram illustrating a relationship between constituent elements for receiving and outputting a broadcasting signal in a home cloud gateway apparatus according to an exemplary embodiment of the present invention.

A broadcasting signal that is transmitted through a broadcasting channel is received through the broadcasting signal receiving unit 15, and particularly, a broadcasting signal of a channel that is selected by interlocking of the control processor 25 and the management unit 21 is received based on a signal that is input from the remote control receiving unit 13. The received broadcasting signal may be output through the graphic output unit 14.

Figure 14:
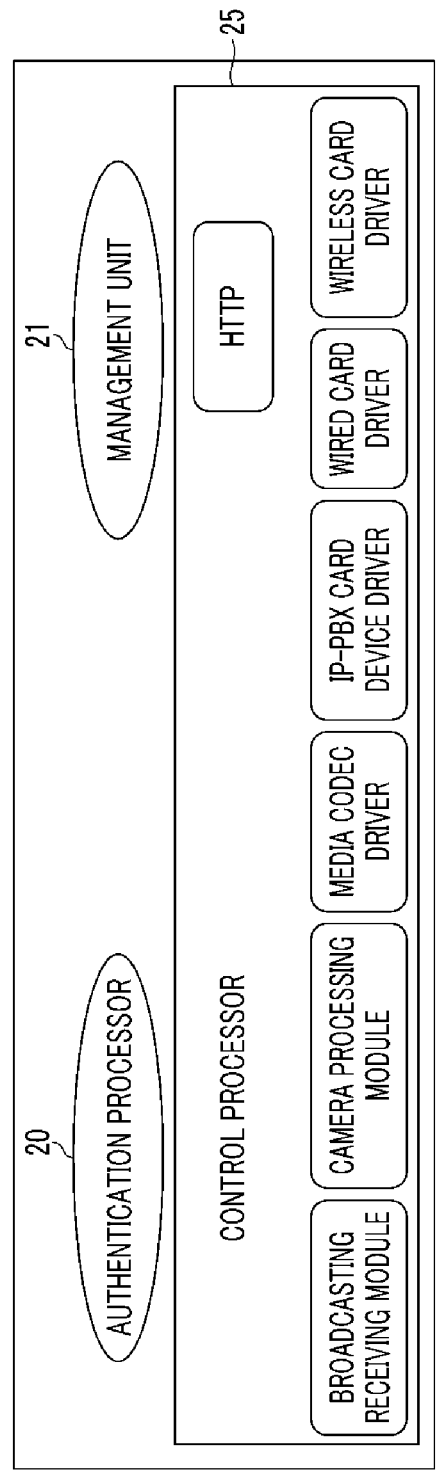
FIG. 14 is a diagram illustrating a driver configuration for managing each element of a home cloud gateway apparatus.

In the home cloud gateway apparatus 100 according to an exemplary embodiment of the present invention, for efficient processing with each constituent element, the control processor 25 includes drivers of a library form, as shown in FIG. 14. FIG. 14 is a diagram illustrating a driver configuration for managing each element of a home cloud gateway apparatus.

As shown in FIG. 14, the control processor 25 may have a form including a broadcasting receiving module for connecting to the broadcasting signal receiving unit 15, a camera processing module for connecting to the image input unit 18, a media codec driver for connecting to the codec 19, an IP-PBX card device driver for connecting to the phone exchange unit 12, and a wired card driver and wireless card driver for connecting to the Internet interface unit 11. Such constituent elements may have a library form and be controlled and managed by the management unit 21 according to HTTP.

In this way, while supporting a service such as a wireless/wired Internet service, an IP phone service, a wired phone service, and a virtual computer service with a hardware method through the Internet interface unit 11, the phone exchange unit 12, the remote control receiving unit 13, the graphic output unit 14, the broadcasting signal receiving unit 15, the Bluetooth communication unit 16, the audio input unit 17, and the image input unit 18, by integration managing the constituent elements with a software method through the codec 19, the authentication processor 20, the management unit 21, the virtualization processor 22, and the session processor 23 that connect to and operate with the control processor 25 that functions as an operating system (OS), the control processor 25 can support the services.

According to such an exemplary embodiment of the present invention, in various IT service environments, a service such as wire/wireless Internet, CATV, satellite television, a personal computer, an Internet phone, and a wired phone can be integrated and provided. Further, a user can receive a related service by connecting to the home cloud gateway apparatus 100 regardless of position. Further, as a virtual computer function instead of a physical computer is provided, maintenance in which the user separately purchases and upgrades a computer is not required and thus the user can use a computer function without a burden of maintenance cost.

Also, a multi-service such as a wireless/wired Internet service, a cable television (CATV) service, a satellite television service, a virtual computer service, an Internet service, and a wired phone service can be provided through connection to apparatuses that are connected to a home network at any time and place through a home cloud gateway apparatus. Therefore, because separate apparatuses for each service through a home network are not required, maintenance cost can be reduced.

Further, the home cloud gateway apparatus provides a security function for a multi-service while integrally performing a function for the multi-service, and thus a user can safely use an apparatus including an indoor computer and phone at any place regardless of a position. Therefore, the home cloud gateway apparatus can efficiently support a home gateway function that enables connection to an indoor communication apparatus at any place regardless of a position.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A home cloud gateway apparatus that is connected to an indoor home network and that provides a service to a client that connects through the network, home cloud gateway apparatus comprising:
   an Internet interface unit that performs Internet communication through a wired or wireless network;
   a storage unit that stores a virtual computer module;
   an authentication processor that performs authentication processing of a connecting client;
   a virtualization processor that provides a virtual computer service by activating a virtualization module that is stored at the storage unit;
   a session processor that performs connection and release of session for a call processing through the Internet by connecting to the Internet interface unit; and
   a control processor that provides an Internet service through the Internet interface unit to a client in which authentication processing has been performed and that provides the virtual computer service by connecting to the virtualization processor,
   wherein the virtual computer service enables the client to access resources of the indoor home network through the home cloud gateway apparatus regardless of a position of the client,
   wherein the virtual computer module is a software method that provides a plurality of functions for the virtual computer service.

2. The home cloud gateway apparatus of claim 1, further comprising:
   a graphic output unit that outputs image data that is generated according to communication;
   a broadcasting signal receiving unit that receives a broadcasting signal that is transmitted from the outside;
   an audio input unit that receives an input of an audio signal;
   an image input unit that receives an input of an image signal; and
   a codec that encodes a signal that is provided from the audio input unit or the image input unit or that decodes and outputs input data.

3. The home cloud gateway apparatus of claim 2, further comprising a remote control receiving unit that receives a remote control signal,
   wherein the control processor receives a broadcasting signal of a broadcasting channel corresponding to the remote control signal from the broadcasting signal receiving unit and provides a broadcasting service that is output through the graphic output unit.

4. The home cloud gateway apparatus of claim 2, wherein the control processor comprises a camera processing module for connecting to the image input unit, a media codec driver for connecting to the codec, an IP-PBX card device driver for connecting to the phone exchange unit, and a wired card driver and wireless card driver for connecting to the Internet interface unit.

5. The home cloud gateway apparatus of claim 1, wherein the control processor comprises a security module that sets a security method according to a connection path of the authenticated client.

6. The home cloud gateway apparatus of claim 5, wherein the security module sets a security method having a higher security ability than a security method that is set when the client connects through wireless Internet, when the client connects through wired Internet.

7. The home cloud gateway apparatus of claim 1, wherein the session processor performs a call connection through Internet, performs an IP phone service that transmits/receives audio and image data of the call through the Internet interface unit and the phone exchange unit according to the control of the control processor, and outputs image data through the graphic output unit.

8. The home cloud gateway apparatus of claim 1, further comprising:
   a phone exchange unit that performs phone communication through a phone network and that performs phone communication through the phone network and the Internet,
   wherein the session processor performs connection and release of a session for call processing through the Internet and the phone network by connecting to the Internet interface unit and the phone exchange unit, and the control processor provides a phone service by connecting to the session processor.

9. The home cloud gateway apparatus of claim 8, wherein the phone exchange unit comprises an IP-PBX interface card.

* * * * *